US012424045B1

(12) United States Patent
Olson et al.

(10) Patent No.: US 12,424,045 B1
(45) Date of Patent: Sep. 23, 2025

(54) OCCUPANCY COUNT SYSTEMS AND METHODS (71) Applicant: Steelcase Inc., Grand Rapids, MI (US)

(72) Inventors: Jorell Alexander Olson, Portland, OR (US); Dirk Buijsman, Hillsboro, OR (US); Mychal Hall, Portland, OR (US); George Alter, Portland, OR (US); Tyler Andrew House, Portland, OR (US)

(73) Assignee: Steelcase Inc., Grand Rapids, MI (US)

( * ) Notice: Subject to any disclaimer, the term of this patent is extended or adjusted under 35 U.S.C. 154(b) by 1024 days.

(21) Appl. No.: 16/811,285

(22) Filed: Mar. 6, 2020

Related U.S. Application Data (60) Provisional application No. 62/814,578, filed on Mar. 6, 2019.

(51) Int. Cl.
*G07C 9/38* (2020.01)
*G01J 5/00* (2022.01)
*G01V 1/00* (2024.01)
*G01V 3/08* (2006.01)
*G01V 8/12* (2006.01)
*G06Q 10/10* (2023.01)
*G06Q 10/109* (2023.01)
*G06V 10/14* (2022.01)
*G06V 10/143* (2022.01)

(52) U.S. Cl.
CPC .............. *G07C 9/38* (2020.01); *G01J 5/0025* (2013.01); *G01V 1/00* (2013.01); *G01V 3/08* (2013.01); *G01V 8/12* (2013.01); *G06Q 10/109* (2013.01); *G06V 10/143* (2022.01)

(58) Field of Classification Search
CPC ........... G07C 9/38; G01J 5/0025; G01V 1/00; G01V 3/08; G01V 8/12; G06Q 10/109; G06K 9/2018
See application file for complete search history.

(56) References Cited

U.S. PATENT DOCUMENTS

| | | | | |
|---|---|---|---|---|
| 5,432,508 A | * | 7/1995 | Jackson | E04H 6/42 340/932.2 |
| 9,591,267 B2 | | 3/2017 | Lipton et al. | |
| 9,946,936 B2 | | 4/2018 | Mizes et al. | |
| 10,354,503 B1 | * | 7/2019 | Kostrun | G08B 13/194 |
| 11,109,465 B2 | * | 8/2021 | Krishnamurthy | H04W 24/10 |
| 2012/0273661 A1 | * | 11/2012 | Lee | H05B 47/115 250/214.1 |
| 2016/0110833 A1 | * | 4/2016 | Fix | G06Q 10/109 705/324 |
| 2017/0364817 A1 | * | 12/2017 | Raykov | G01J 5/0025 |
| 2018/0370034 A1 | * | 12/2018 | Lee | G07C 9/00 |
| 2019/0012607 A1 | * | 1/2019 | Holliday | G06K 9/00771 |

* cited by examiner

*Primary Examiner* — Arleen M Vazquez
*Assistant Examiner* — Lynda Dinh
(74) *Attorney, Agent, or Firm* — Quarles & Brady LLP (57) ABSTRACT

Systems and methods for improved occupancy count for a space are provided. The systems and methods utilize one or more boundary sensors and one or more space sensors. The boundary sensors are utilized to determine entry and exit from the space and the space sensors are used to determine if the space is empty. If the space sensors determine that the space is empty and an active occupancy count is greater than zero, then the active occupancy count is reset to zero.

17 Claims, 6 Drawing Sheets

OCCUPANCY COUNT SYSTEMS AND METHODS

CROSS-REFERENCE TO RELATED APPLICATIONS

This application is related to, claims priority to, and incorporated herein by reference for all purposes U.S. Provisional Patent Application No. 62/814,578, filed Mar. 6, 2019.

STATEMENT REGARDING FEDERALLY SPONSORED RESEARCH

N/A

BACKGROUND

Occupancy and presence sensing technology is presently deployed in a variety of contexts. Some systems are used to determine how many people are present in a space. These systems often suffer from a "Thunderdome problem", where a pair of individuals entering a space and exiting a space are not accurately sensed, so it appears that two individuals entered the space and one individual exited the space. This problem produces an inaccurate count of the number of individuals present and shows that one individual remains in the space when in reality the space is empty. The current state of the art for dealing with this problem involves resetting the occupancy count to zero at a predetermined time. For example, if the space is used during business hours, the occupancy count is reset overnight when the system can be relatively sure that the occupancy is actually zero. This approach has limited usefulness when spaces are not empty in such a predictable fashion or when an accurate count is desired for more regular observation.

Accordingly, a need exists for occupancy sensing systems and methods that are robust in terms of their ability to accurately sense occupancy and to accurately determine how many people are present in a given space at a given time.

BRIEF SUMMARY

The present disclosure provides systems and methods for improved occupancy count.

In one aspect, the present disclosure provides a sensor system. The sensor system includes one or more boundary sensors, one or more space sensor, a processor, and a non-transitory computer-readable medium. The one or more boundary sensors are configured to be positioned and calibrated to measure entrance into a space and exit from the space by one or more occupants. The one or more boundary sensors have a known error rate for measuring the entrance into the space and/or the exit from the space. The one or more space sensors are configured to be positioned and calibrated to determine absence of occupants within the space. The processor is operatively coupled to the one or more boundary sensors and the one or more space sensor. The non-transitory computer-readable medium has stored thereon instructions that, when executed by the processor, cause the processor to: autonomously maintain an active count of occupancy of the space by counting instances of entrance into the space and exit from the space by the one or more occupants; in response to the active count of occupancy of the space being less than zero, adjust the active count to zero; in response to the one or more space sensors providing a determination of zero occupancy of the space when the active count is greater than zero, adjust the active count to zero; and provide the active count.

In another aspect, the present disclosure provides a method of maintaining an active count of users in a space. The method includes: a) monitoring one or more boundary sensors positioned and calibrated within the space to measure entrance into the space and exit from the space by one or more occupants, the one or more boundary sensors having a known error rate for measuring the entrance into the space and/or the exit from the space; b) monitoring one or more space sensors positioned and calibrated to determine absence of occupants within the space; c) autonomously maintaining an active count of occupancy of the space by counting instances of entrance into the space and exit from the space by the one or more occupants; d) in response to the active count of occupancy of the space being less than zero, adjusting the active count to zero; e) in response to the monitoring of step b) providing a determination of zero occupancy of the space when the active count is greater than zero, adjusting the active count to zero; and f) providing the active count.

In yet another aspect, the present disclosure provides a non-transitory computer-readable medium having stored thereon instructions that, when executed by a processor, cause the processor to: a) monitor one or more boundary sensors positioned and calibrated within the space to measure entrance into the space and exit from the space by one or more occupants, the one or more boundary sensors having a known error rate for measuring the entrance into the space and/or the exit from the space; b) monitor one or more space sensors positioned and calibrated to determine absence of occupants within the space; c) autonomously maintain an active count of occupancy of the space by counting instances of entrance into the space and exit from the space by the one or more occupants; d) in response to the active count of occupancy of the space being less than zero, adjust the active count to zero; e) in response to the monitoring of step b) providing a determination of zero occupancy of the space when the active count is greater than zero, adjust the active count to zero; and f) provide the active count.

In yet another aspect, the present disclosure provides a method of using the active count provided by the methods described herein. The method includes providing a recommendation about usage of a space in view of the active count.

In a further aspect, the present disclosure provides a method of using a space with improved efficiency. The method includes: a) monitoring one or more boundary sensors positioned and calibrated within the space to measure entrance into the space and exit from the space by one or more occupants, the one or more boundary sensors having a known error rate for measuring the entrance into the space and/or the exit from the space; b) monitoring one or more space sensors positioned and calibrated to determine absence of occupants within the space; c) autonomously maintaining an active count of occupancy of the space by counting instances of entrance into the space and exit from the space by the one or more occupants; d) in response to the active count of occupancy of the space being less than zero, adjusting the active count to zero; e) in response to the monitoring of step b) providing a determination of zero occupancy of the space when the active count is greater than zero, adjusting the active count to zero; f) recording the active count and a time at which the active count is recorded; g) repeating steps c), d), e), and f) to provide a data set including a plurality of active counts versus time; and h)

adjusting a usage of the space if the data set indicates that the active count is zero for a percentage of time that exceeds a predetermined threshold.

DETAILED DESCRIPTION

Before the present invention is described in further detail, it is to be understood that the invention is not limited to the particular embodiments described. It is also to be understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Embodiments referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

As used herein, "passive motion sensor" refers to a sensor that does not actively emit a signal that is used for sensing, but rather includes only a detection aspect for sensing a signal that is relevant to motion and/or presence. Examples of passive motion sensors include, but are not limited to, passive infrared sensors, capacitive proximity sensors, accelerometers, pressure sensors, reflectometers, time-of-flight systems, (low-cost) radar, (low-cost) lidar, and other sensors known to those having ordinary skill in the art to function on similar principles to the passive infrared sensor.

As used herein, the term "known error rate" refers generally to a sensor that is understood to be less than 100% accurate at a given task. An error rate need not have a specific numeric value in order to be a known error rate. For example, a passive infrared sensor that senses motion to control room lights can be understood to have a known error rate at determining when a space is empty the very first time the lights in the room go off when a person is present (often resulting in waving one's hands to get the lights to turn back on). Such a sensor is configured to be positioned and calibrated for use in a space to measure whether a person is present in a space (by measuring motion via changes in intensity of received infrared light) and that turning the lights off when an individual is present constitutes an error. Without knowing anything specific about that passive infrared sensor's numerical error rate, it has a known error rate if there is even a single instance of turning the lights off with an individual present.

The present disclosure relates to systems and methods for monitoring motion, presence, occupancy, or the like using one or more passive motion sensors. The passive motion sensors can be space sensors, which are configured to monitor motion within a broader space. The passive motion sensors can be boundary sensors, which are configured to monitor motion within a narrower space to determine when a boundary is penetrated.

The present disclosure also relates to systems and methods for monitoring motion, presence, occupancy, or the like using one or more motion sensors that can be active or passive motion sensors. Again, these sensors can be space sensors, boundary sensors, or other sensors known to those having ordinary skill in the art.

Figure 1:
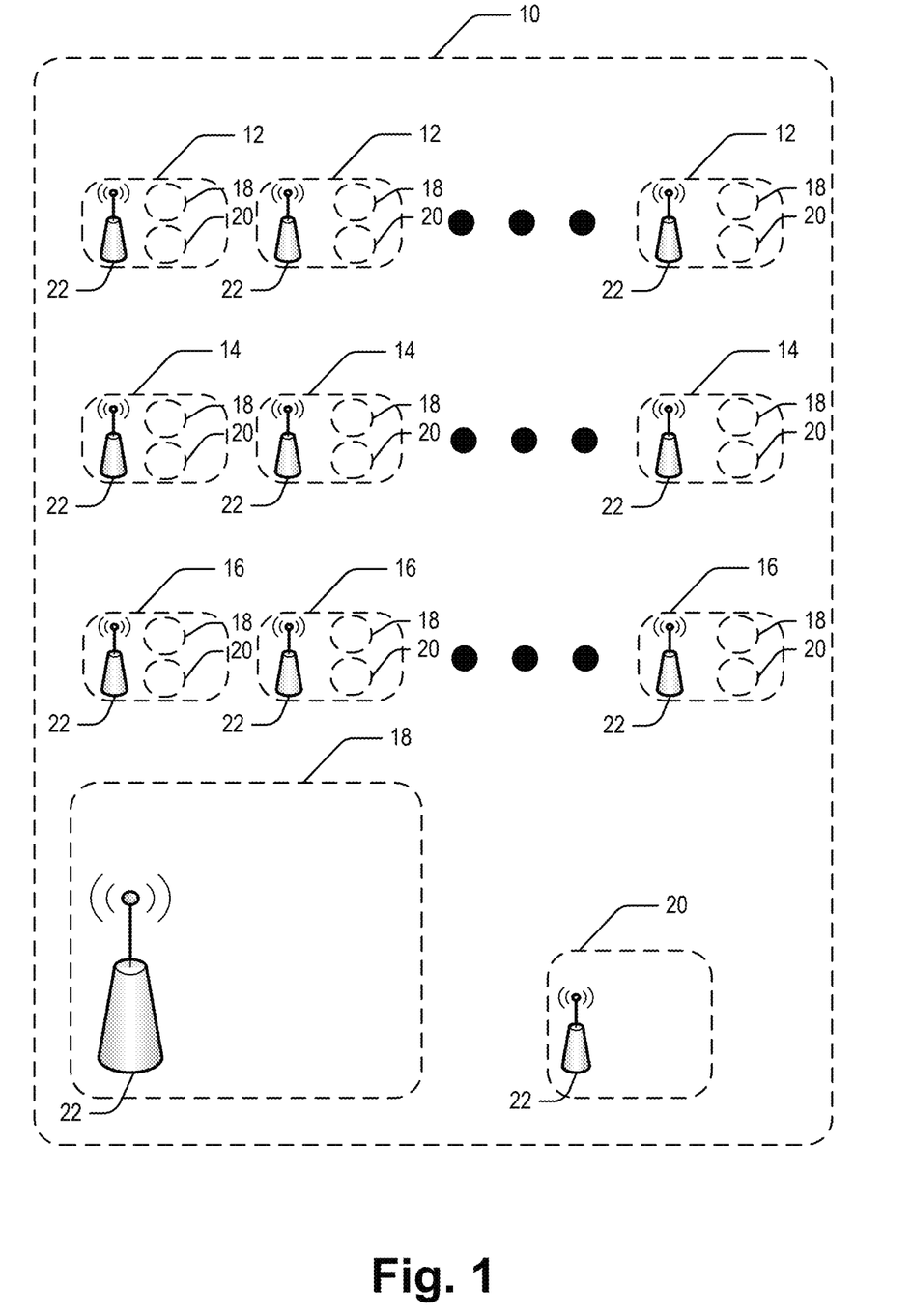
FIG. 1 is a schematic representation of a system in accordance with the present disclosure.

Referring to FIG. 1, this disclosure provides a system 10 for monitoring occupancy of a space. The system can include one or more space sensors 12, one or more boundary sensors 14, and one or more gateways 16. The system 10 can also include a processor 18 and a memory 20. Each of the space sensors 12, boundary sensors 14, gateways 16, processor 18, and memory 20 can include a wireless communication transceiver 22. While a wireless communication embodiment is illustrated, any of the components of system 10 can be hardwired to one another as understood by those having ordinary skill in the art. In some cases, the system 10 can be deployed with one or more space sensors 12 and without any boundary sensors 14. In some cases, the system 10 can be deployed with one or more boundary sensors 14 and without any space sensors 12. In some cases, the system 10 can be deployed without the one or more gateways 16. In those cases, the one or more space sensors 12 and the one or more boundary sensors 14 can be configured to communicate directly with the processor 18. In some cases, the one or more space sensors 12, the one or more boundary sensors 14, and the one or more gateways 16 can include a processor 18 and a memory 20 locally co-housed with the respective sensors and/or gateways.

Figure 2:
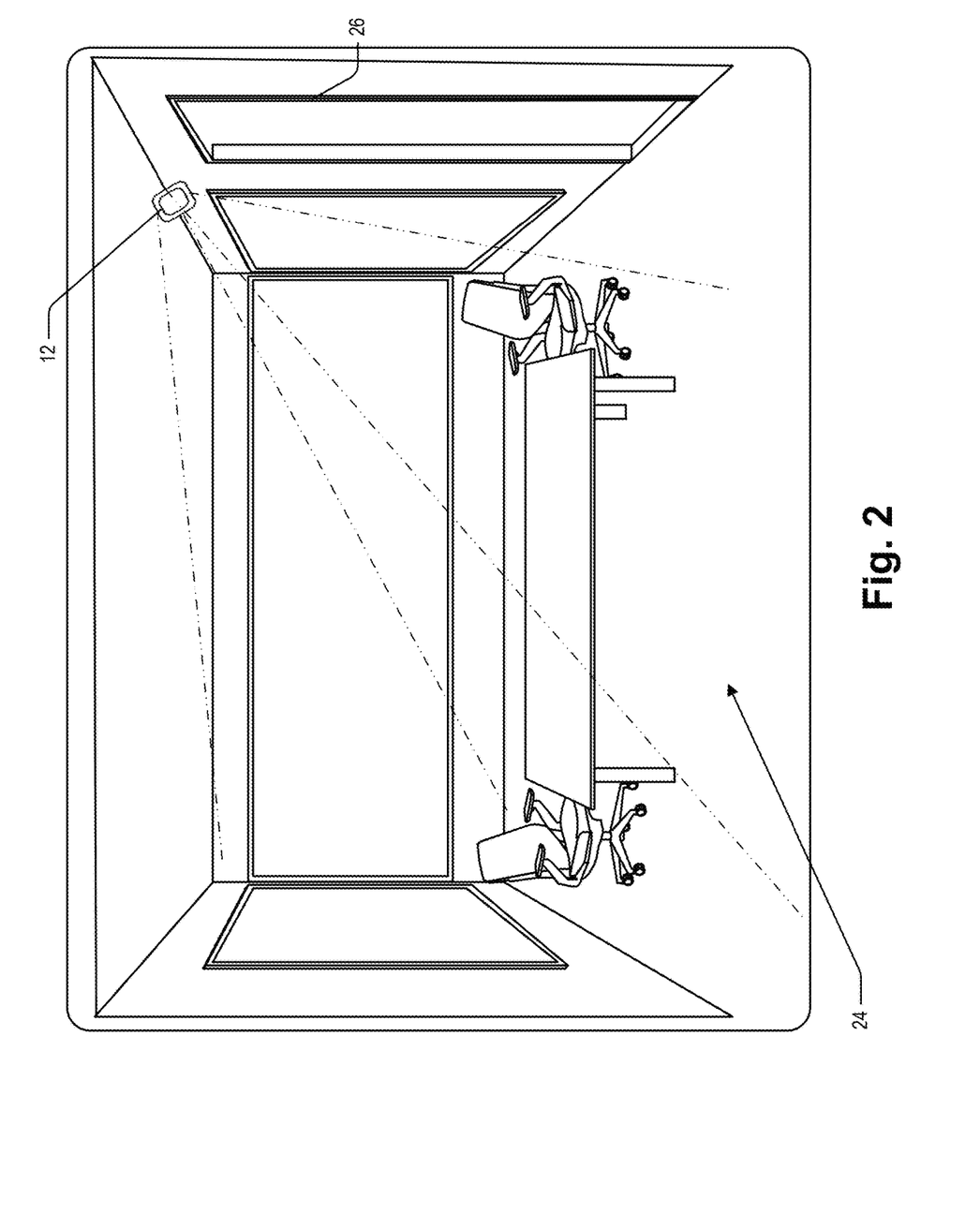
FIG. 2 is a space showing deployment of a system in accordance with the present disclosure.

Referring to FIG. 2, one exemplary aspect of the system 10 is illustrated. In this aspect, the space 24 is the area of the room that is capable of being monitored by a single passive sensor. The system 10 include a single passive sensor in the form of a space sensor 12. The space sensor 12 can be mounted above the door 26 or can be mounted elsewhere as illustrated in FIG. 3.

Figure 3:
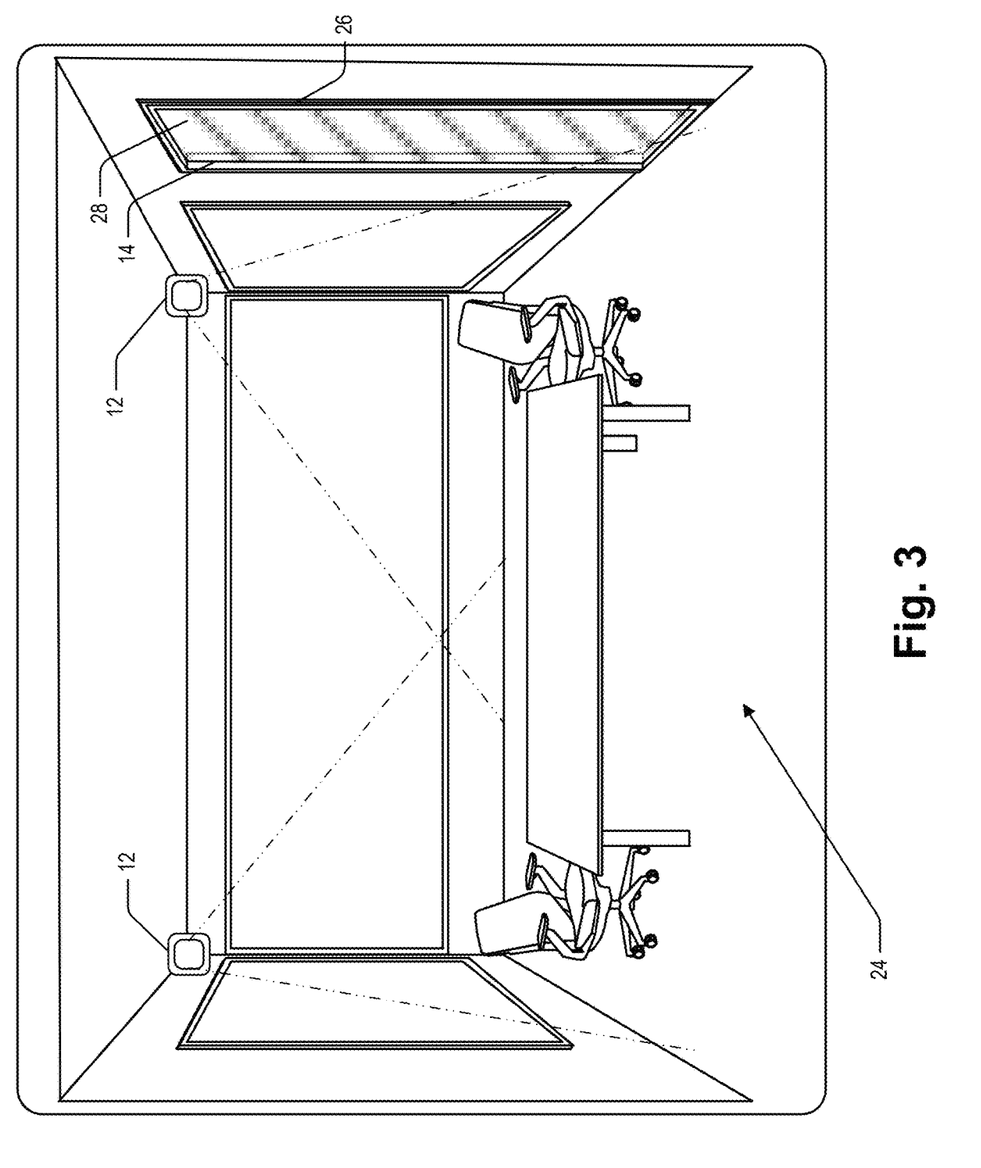
FIG. 3 is a space showing deployment of a system in accordance with the present disclosure.

Referring to FIG. 3, one exemplary aspect of the system 10 is illustrated. In this aspect, the space 24 is the entire area of a room. The system 10 includes two space sensors 12 mounted in corners of the room (note: more or less space sensors 12 can be deployed and they can be placed in different locations, depending on the desired sensing properties). In this illustrated aspect, the only way into our out of the room is via a door 26. A boundary sensor 14 is mounted in the vicinity of the door or within a part of the door, such as the door frame, and is configured to project a boundary field 28 into the doorway. The boundary sensor 14 is configured to sense when the boundary field 28 is penetrated by an object.

Figure 4:
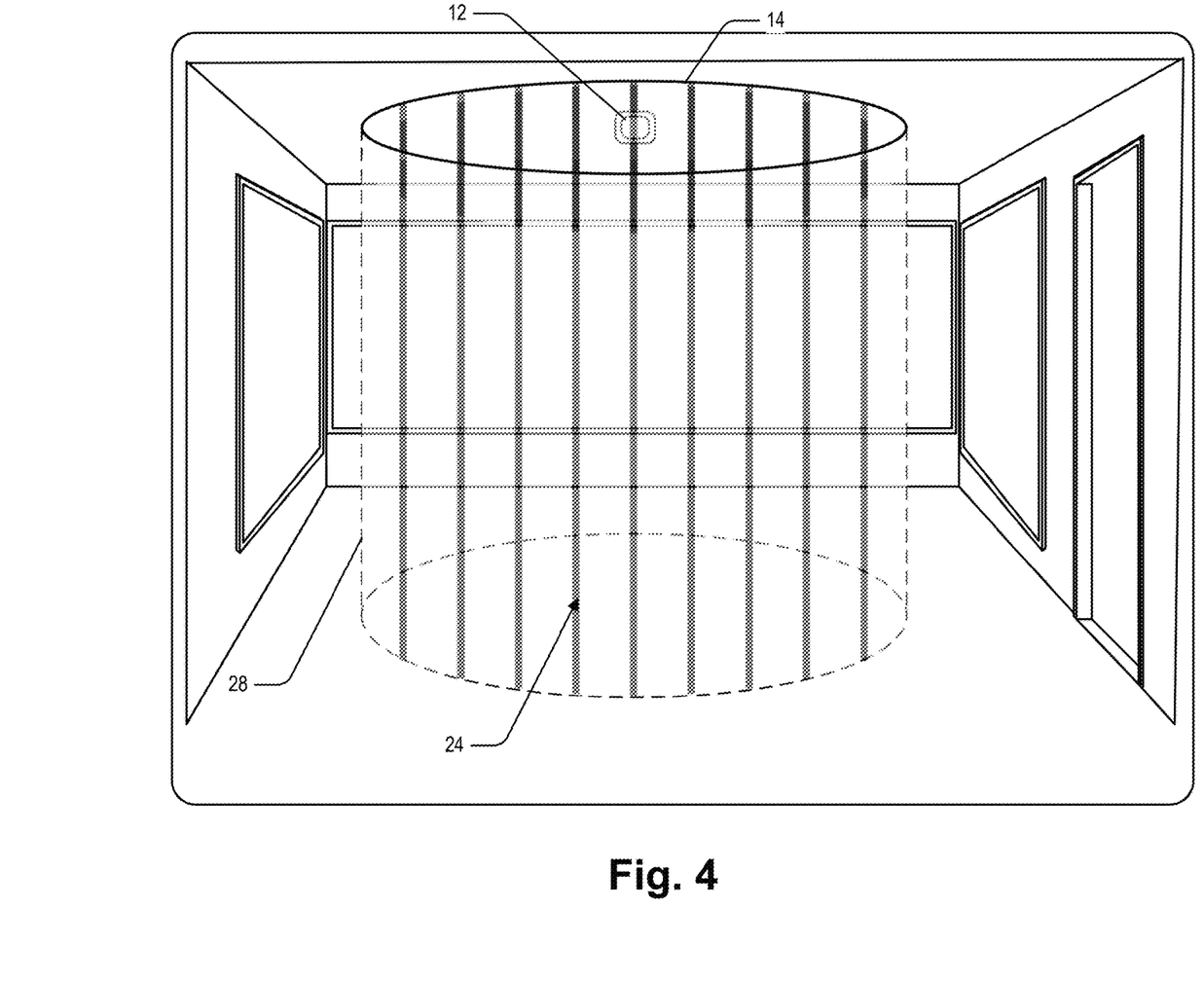
FIG. 4 is a space showing deployment of a system in accordance with the present disclosure.

Referring to FIG. 4, another exemplary aspect of the system 10 is illustrated. In this aspect, the space 24 is a portion of the area of the room. The system 10 includes one space sensor 12 mounted directly above the space 24. In this illustrated aspect, the space 24 can be entered from any horizontal direction (i.e., it cannot be entered from above, due to the ceiling, or below, due to the floor). A boundary sensor 14 is mounted and configured to project a boundary field 28 that covers at least a portion of the boundary of the space 24. In the illustrated aspect, the boundary sensor 14 projects a cylindrical boundary field 28 that covers the entirety of the boundary of the space. In other aspects, the system 10 can include more than one boundary sensor 14 that each projects a boundary field 28 that covers a portion of the boundary of the space, with the total coverage provided by the multiple boundary fields 28 being sufficient to sense penetration of the boundary.

Figure 5:
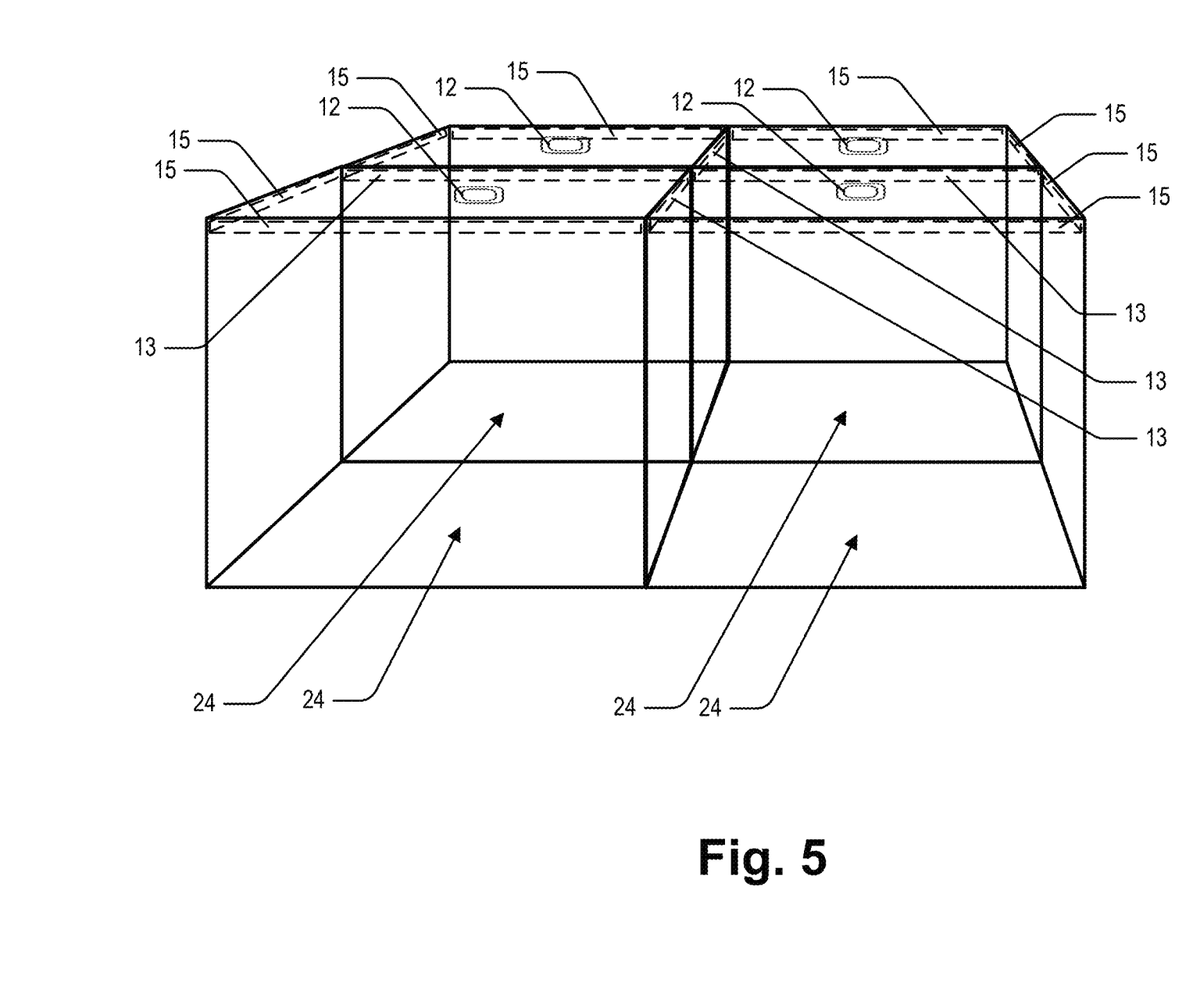
FIG. 5 is a space showing deployment of a system in accordance with the present disclosure.

Referring to FIG. 5, another exemplary aspect of the system 10 is illustrated. In this aspect, the space 24 is an area within an open floor plan and the open floor plan includes multiple spaces 24. The system 10 includes at least one space sensor 12 for each space 24. The space sensor 12 can be configured and positioned to provide sufficient coverage of each space 24. One or more boundary sensors 14 are mounted and configured to project one or more boundary fields 28 (not illustrated in this FIG. for ease of viewing, but would be projected along the vertical sides of each cube representing space 24) that cover at least a portion of the boundary of the space 24. In the illustrated aspect, the spaces 24 are square or block shaped and the boundary sensors 24 are configured to project the boundary fields 28 in a linear fashion along the edges of the square- or box-shaped spaces 24. In this case, the system 10 can utilize a single boundary sensor 14 to sense the boundary of multiple spaces 24, such as two neighboring spaces 24 that share a single boundary. The internal boundary sensors 13 are configured to monitor the boundary between two adjacent spaces 24 and the external boundary sensors 15 are configured to monitor the boundary between a space 24 and surrounding areas.

Figure 6:
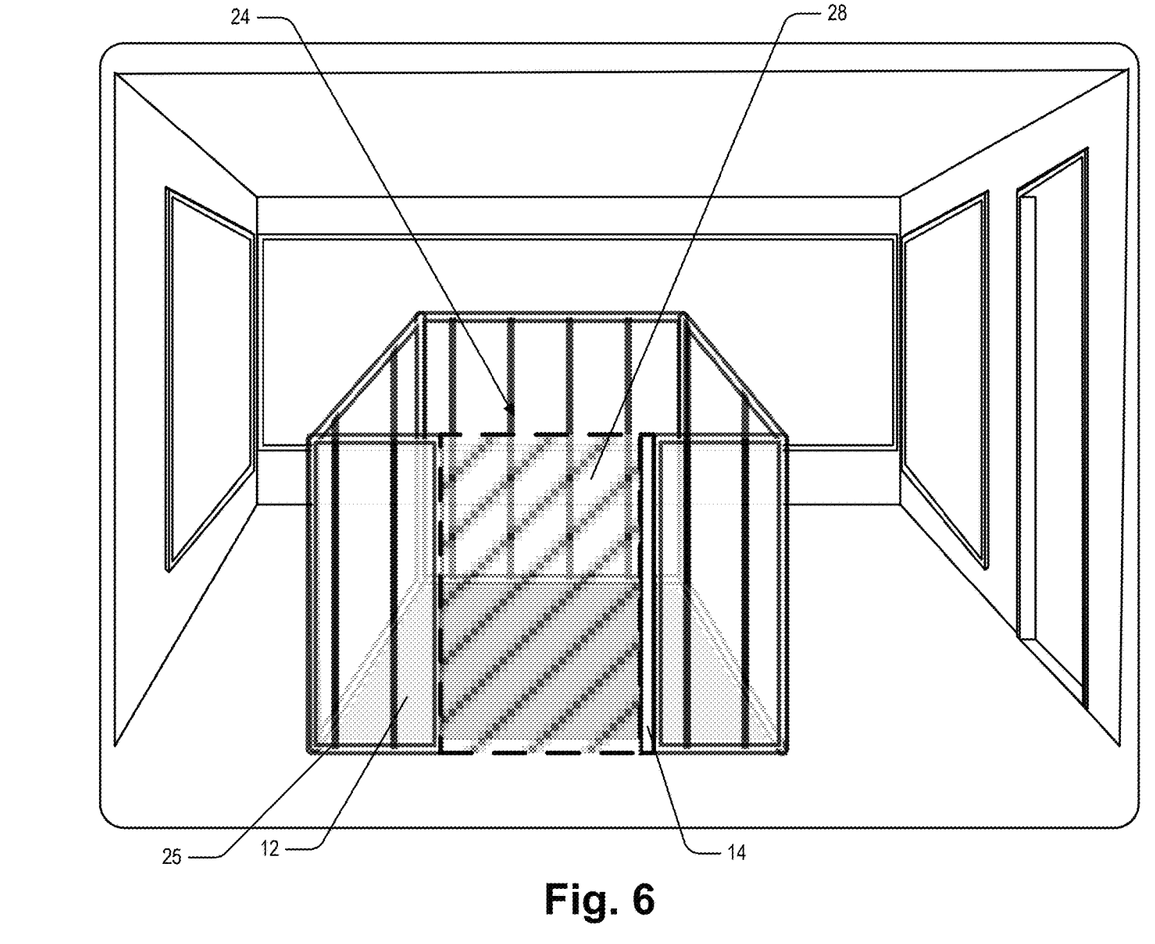
FIG. 6 is a space showing deployment of a system in accordance with the present disclosure.

Referring to FIG. 6, another exemplary aspect of the system 10 is illustrated. In this aspect, the space 24 is a workstation bounded by partition panels 25, and the specifically illustrated aspect shows a cubicle. The system can include at least one area of volume sensor 12 for the space 24, such as the illustrated pressure-sensitive mat. One or more boundary sensors 14 can be mounted and configured to project one or more boundary field 28 across an entrance to the cubicle. In some cases, the one or more boundary sensors 14 can be positioned to only monitor movement through the entrance to the cubicle, while in other cases, the one or more boundary sensors 14 can be positioned to monitor movement between the tops of the partition panels 25 and the ceiling.

The space 24 can be a room, a workstation bounded by partition panels, such as personal semi-open working environment or a cubicle, an arbitrarily-defined area or volume, or another location where a determination of occupancy status is desired. It should be appreciated that, while the system 10 is described in the context of these spaces 24, the inventive concept of the present disclosure can be used in any occupancy determination context. The concepts are applicable not only to spaces 24, but any permanent object.

The system 10 can include one or more space sensors 12 positioned in the space or locations near to the space. The one or more space sensors 12 can be configured to monitor an area or a volume within the space 24. The one or more space sensors 12 can be oriented to monitor a portion of the space or the entire space. Examples of suitable space sensors 12 include, but are not limited to, passive infrared (PIR) sensors, floor pressure sensors, ultrasonic sensors, microwave sensors, other infrared sensors (e.g., thermopile, thermopile array, infrared camera, etc.), video sensors, acoustic sensors, and the like.

The space sensors 12 can be battery operated. In some cases, the systems and methods described herein can extend battery lifetime by reducing the amount of communication signals necessary to make an occupancy determination.

In cases where a single space sensor 12 is deployed, the space sensor 12 can be configured to provide high coverage of the space 24, such as at least 90%, at least 95%, or at least 99% coverage of the space 24, or low coverage of the space 24, such as at most 50%, at most 25%, or at most 10% coverage of the space 24.

In cases where multiple space sensors 12 are deployed, the layout of the space sensors can be configured to provide high coverage of the space, such as at least 90%, at least 95%, or at least 99% coverage of the space, or low coverage of the space, such as at most 50%, at most 25%, or at most 10% coverage of the space 24.

It should be appreciated that the coverage described here is not only suitable for the function of the present disclosure, but in fact, the present disclosure contemplates low coverage situations where occupancy can still be accurately determined.

It should be appreciated that some space sensors 12 can have "soft edges" to the area of coverage they provide. For example, 70% of a space can be covered extremely well, 20% can be covered somewhat well, and 10% can be covered poorly. For the purposes of defining coverage in the space sensor 12 context, a space sensor 12 can be considered to cover a volume if the space sensor 12 detects motion of a hand-sized object moving back and forth over a distance of 0.5 meters.

In certain cases, the space sensor 12 can be a motion sensor that senses motion within the space.

In certain cases, the space sensor 12 can be a pressure sensor, for example a floor or mat that is pressure sensitive, which senses pressure in a floor located in the space.

In certain cases, the space sensor 12 can be an ultrasonic or Doppler sensor.

The space 24 can have a boundary. In some cases, the boundary is defined by a door or other passageway, ingress, egress, or the like. In other cases, the boundary is an arbitrarily-defined area.

The system can include one or more boundary sensors 14 positioned and configured to monitor penetration of at least a portion of the boundary. Examples of suitable boundary sensors 14 include, but are not limited to, curtain sensors, such as optical curtain sensors or magnetic curtain sensors, break-beam (also known as, "electric eye") sensors, other infrared curtain sensors (e.g., thermopile, thermopile array, infrared camera, etc.), video sensors, and the like.

In certain cases, the one or more boundary sensors 14 can be configured to provide at least 90%, at least 95%, or at least 99% coverage of the boundary of the space. For the purposes of defining coverage in the boundary sensor 14 context, a boundary sensor 14 can be considered to cover an area of the boundary if the boundary sensor 14 detects movement of a golf ball sized object through the boundary.

The boundary sensors 14 can in some instances be directional boundary sensors that can sense the direction of movement through the boundary. For example, if two boundary sensors 14 are placed on the boundary with a very small distance separating the boundary sensors 14, then the small difference in timing between sensing penetration can be used to determine the direction of travel.

The space sensors 12 and boundary sensors 14 can be configured to communicate via a low energy consumption communication protocol, such as Bluetooth®, including Bluetooth® 4.0, Bluetooth® 4.1 Bluetooth® 4.2, Bluetooth® 5.0, Bluetooth® LE, and Bluetooth® Smart, IEEE802.15.4 (ZigBee®, 6LoWPAN, Thread®), via IEEE802.11 (WiFi), and the like. Of course, this system can be used with other, later issued low energy consumption communication protocols, as well as with other communication protocol specifications.

The system 10 can include one or more gateways 16 configured to send signals to and receive signals from the one or more space sensors 12 and the one or more boundary sensors 14. In instances where the one or more gateways 16 include at least two gateways 16, the at least two gateways 16 can be configured to communicate with one another via a low energy consumption communication protocols, such as Bluetooth®, via IEEE802.3 Ethernet, via IEEE802.11 (WiFi), and the like.

In some cases, the sensors 12, 14 can be integrated into a single unit. For example, a single unit residing above a door could monitor a space using a space sensor 12 and simultaneous monitor penetration of the door using a boundary sensor.

In some cases, the sensors 12, 14 and the communication capabilities of the gateway 16 can be integrated into a single unit.

The system can include a processor 18 and a memory 20 that are in wired or wireless electronic communication with the gateway 16. The processor 18 and memory 20 can be integrated into the gateway 16 or can be remote from the gateway 16. In some cases, the processor 18 and memory 20 can be housed within the same facility as the sensors 12, 14 and gateway 16. In other cases, the processor and memory can be housed within a different facility than the sensors and gateway. For example, the processor 18 and memory 20 can be cloud computing systems.

The processor 18 can be configured to communicate with the gateway via a low energy consumption communication protocol, such as Bluetooth®, via IEEE802.3 Ethernet, via IEEE802.11 (WiFi), and the like.

The motion sensors described herein can also include various fall sensors, orientation sensors, height sensors, and the like (not illustrated).

In one specific aspect, the present disclosure provides a sensor system, which can include any or all of the features described above with respect to system 10. The sensor system includes one or more boundary sensors, one or more space sensors, a processor, and a non-transitory computer-readable medium. The one or more boundary sensors are configured to be positioned and calibrated to measure entrance into a space and exit from the space by one or more occupants. The one or more boundary sensors have a known error rate for measuring the entrance into the space and/or the exit from the space. The one or more space sensors are configured to be positioned and calibrated to determine absence of occupants within the space. The processor is operative coupled to the one or more boundary sensors and the one or more space sensor. The non-transitory computer-readable medium has stored thereon instructions that, when executed by the processor, cause the processor to execute the steps of the methods described herein.

Multiple boundary sensors can be utilized to monitor multiple different ways to enter and exit the space. Those multiple sensors can be used in concert to deduce a collective number of entrances into the space and exits from the space. In other words, if an individual enters the space via one entrance, the sensor can sense that entrance and the active count can increase by 1, while if the individual exits the space via a different entrance, a different sensor can sense that exit and the active count can decrease by 1. Similarly, if two individuals enter (or exit) the space via different entrances, sensors associated with those entrances (or exits) can sense those individuals entering (or exiting) the space and the active count can increase (or decrease) by 2.

The space can be a room, such as illustrated in FIGS. 2 and 3. The space can be an arbitrarily-defined area, such as illustrated in FIGS. 4 and 5.

The space can be a conference room, a study room, a meeting room, a convention hall, a hallway, a classroom, a hotel room, a public bathroom, other spaces that a person having ordinary skill in the space management arts would understand to be a useful setting for the systems and methods described herein for maintaining an accurate active count of occupants, or a combination thereof.

The system 10 can include additional sensors (not illustrated), whose signals can be utilized in the systems and methods described herein. Non-limiting examples of such additional sensors include a door sensor configured to monitor state of a door (i.e., whether a door is open or closed) that is one of the ways to enter or exit the space, a manual light switch sensor configured to monitor a state of a manual light switch positioned within the space, an electronic equipment sensor configured to monitor a state of a piece of electronic equipment within the space, and the like. The door sensor can be used to identify when a boundary sensor is responding to activity near a closed door and can direct the system 10 to ignore indications of entrance or exit from the space via that door. In other words, if the system 10 senses that a door is closed, then the system 10 can preclude the active count from increasing or decreasing. The door sensor can be a Hall sensor, though other sensors are contemplated and would be appreciated by those having ordinary skill in the sensing arts. The manual light switch sensor can be used to raise the active count from zero to 1 or more in the event that the manual light switch is activated when the active count is zero. In other words, if the system 10 senses that the manual light switch in a space has been activated but the active count indicates that the space is unoccupied, then the system 10 can infer that at least one individual is present in the space. The electronic equipment sensor can be used in a fashion similar to the manual light switch sensor, where activation of a piece of electronic equipment (specifically, electronic equipment that requires local activation, such as a power button on a monitor) can be used to infer that at least one individual is present in the space. In some cases, the electronic equipment is a telepresence system, an electronic piece of furniture, such as a height adjustable table, or the like.

In some cases, the systems and methods can include an additional sensor monitoring an area located just outside the space for indications of presence or movement. In these cases, the methods can prevent the changing of an active count that would have otherwise been changed if the sensor located just outside the space does not provide an indication that an individual has entered that space. In other words, by monitoring an area just outside of the space, the method can prevent an otherwise erroneous adjustment of the active count that would have happened based on the standard boundary sensor monitoring.

The present disclosure includes various methods, as discussed below. These methods can be used in combination with various features of the systems described above or with other aspects of different methods described below, unless the context clearly dictates otherwise.

In an aspect, the present disclosure provides a method of maintaining an active count of users in a space. The method includes: a) monitoring one or more boundary sensors positioned and calibrated within the space to measure entrance into the space and exit from the space by one or more occupants, the one or more boundary sensors having a known error rate for measuring the entrance into the space and/or the exit from the space; b) monitoring one or more space sensors positioned and calibrated to determine absence of occupants within the space; c) autonomously maintaining an active count of occupancy of the space by counting instances of entrance into the space and exit from the space by the one or more occupants; d) in response to the active count of occupancy of the space being less than zero, adjusting the active count to zero; e) in response to the monitoring of step b) providing a determination of zero occupancy of the space when the active count is greater than zero, adjusting the active count to zero; and f) providing the active count.

In some cases, the methods further includes maintaining a non-adjusted count. The non-adjusted count can be used for data analysis to observe trends that would be missed if only the active count is recorded. For example, if a given counting error occurs repeatedly, the non-adjusted count can provide insight into the cause of that counting error.

In some cases, the methods can adjust the active count to a known value and/or a measured value. For example, if a more expensive sensor or algorithm periodically provides a very accurate occupancy count, then that value can be used for adjusting the active count to be more accurate. Alternately, a manual input can be used to update the active count. It should be appreciated that these additional features do not change the underlying method of maintaining the active count.

In some cases, step e) can be replaced with the following: e) in response to the monitoring of step b) providing a measured occupancy count that is different than the active count, adjust the active count to the measured occupancy count.

The present disclosure also provides a method of using a space with improved efficiency. The methods can include the method of maintaining an active count, as described elsewhere herein, and adjusting usage of a space in response to the active count. In some cases, the adjusting is in response to a data set including the active count versus time.

A non-transitory computer-readable medium can have instructions stored thereon that, when executed by a processor, cause the processor to execute the methods described herein.

The active count of step f) can be provided to a computerized scheduling program, an emergency management program, a program or other location understood by those having ordinary skill in the space management arts to be aided by an accurate occupancy count, or a combination thereof. Examples of commercially-available computerized scheduling programs include, but are not limited to, the Find Conference Scheduling & Meeting Room App or the Workplace Advisor space management tool, both by Steelcase Inc., Grand Rapids, Michigan.

Steps c), d), e) and f) can be repeated to provide the active count at different times. These active counts can be recorded along with the times to which they are associated to provide a data set that includes the active count versus time.

The method can include controlling one or more affordances based on the active count. The affordances can include lights, computers, computer accessories, powered furniture such as height-adjustable tables, displays, projectors, sound equipment, environment controls (heating, air conditioning, HVAC), elevators, an occupancy indicator (e.g., a sign indicating bathroom occupancy/vacancy), and the like.

The active count provided by the systems, methods, and non-transitory computer-readable medium described herein can be used to improve usage of a space. The active count can be utilized to provide a recommendation for the usage of the space.

In one specific non-limiting example, the active count can be maintained as described herein and a scheduling program can utilize the active count in order to reserve, release, reschedule, or otherwise adjust a room reservation system based on the active count. If a room is reserved for a 3-hour meeting, but the active count remains zero for the first 15 minutes of that 3-hour window, then the room reservation system can cancel the reservation and release the room for other uses.

In one specific non-limiting example, the active count or the historic count can be utilized as data inputs for use in predictive analytics which optimize space utilization. Predictive analytics have been utilized to design new space designs, such as a new healthcare clinic, using data gathered in an existing space, such as existing clinics.

In one specific non-limiting example, the active count can be maintained as described herein and a space usage can be altered based on the active count. For example, if a space is being utilized as a quick meeting space where meetings can only be scheduled for a limited length and where reservations can only be made a short amount of time before the reservation is slated to begin, but the active count indicates that this particular usage results in occupancy less than 30% of the time, then the space could be changed to be used in a different context in an effort to increase the usage of the space. As another example, if two adjacent spaces are being utilized for meetings of 4 or fewer people and could be combined to be used for meetings of 8 or fewer people, but the active count indicates that the use of the two spaces for 4 or fewer people results in occupancy less than 50% of the time, then the two spaces could be merged into a single space for 8 or fewer people in an effort to increase the usage of the space.

In one specific non-limiting example, a large space such as a hallway can be monitored via multiple space sensors positioned to cover the entire area of the space and multiple boundary sensors positioned to cover all entrances and exits for the space. Having an active count of individuals within this large space could be used in a commercial setting for determining the foot traffic in a given shopping area, in an educational setting for determining the number of students present in the hallways at given times throughout the school day, in a convention hall to determine the number of attendees at a given portion of a conference at a given time, or to aid in compliance with fire code by ensuring that no more than the safe number of occupants is present at a given time.

In one specific non-limiting example, the active count can be used to determine the most efficient furniture arrangement for a space. For example, if a space is being used 50% of the time with a single table and four chairs and over 90% of the time with two separate tables and six chairs, then the space can be arranged with the two separate tables and six chairs in order to increase usage of the space. Similarly, the active count can be used to determine the most efficient affordances to include in a space. If a space is used less than 25% of the time without a telepresence system, but is used over 75% of the time with a telepresence system, then the space can be outfitted with the telepresence system in order to increase space usage.

In some cases, the active count can identify different trends at different times of the day or week. For example, a given room might be most efficiently used as a collaborative space during work hours and most efficiently used as an individual private work space outside of work hours. This trend can be identified using the active count and computational methods understood to those having ordinary skill in the signals analysis art.

The systems and methods described herein can be used to alter the arrangement of a space in order to provide improved flow of people through a space. For instance, the methods and systems could identify that a hallway is particularly crowded at given points of the day and further analysis of those times of day can provide insight into reducing foot traffic.

The systems and methods described herein can be used to keep the number of individuals within a space below a threshold number. For example, if a concert has tickets that are sold on a general admission basis and has several general admission areas, a given area could be closed once the active count reaches the capacity for that given general admission area.

A person having ordinary skill in the art would appreciate that the use cases of this more accurate and computationally inexpensive active occupancy count are too numerous to recite in detail herein, so the description of specific example scenarios is not intended to be limiting. The active occupancy count can be utilized to achieve improved space usage in the same ways that one would utilize an active occupancy count acquired by more manual and/or more expensive means.

It should be appreciated that the present disclosure describes an automated system that provides a robust active occupancy count using inexpensive passive sensors. It should be appreciated that the same level of performance can be achieved by manual means or much more expensive means. Specifically, a human sitting inside a room and/or walking around a room can provide an accurate active occupancy count and can communicate that count for further usage, but the requirement of a human being present is quite inefficient. Similarly, a very expensive camera system with complicated algorithms that identify human beings based on image analysis techniques can also provide an accurate active occupancy count, but the cost of cameras, software, and the computational capacity to perform such methods is cost-prohibitive. The system and methods described herein utilize relatively inexpensive boundary sensors which have known error rates to provide an active count and relatively inexpensive space sensors which have an ability to provide a reasonably robust determination that a space is unoccupied to provide a significantly more accurate active occupancy count. The systems and methods described herein are particularly useful with systems that require battery-operated sensors. The systems and methods described herein provide an accurate occupancy count with surprisingly little processing power. In order to provide data-driven solutions to space usage efficiency, the data must be acquired both accurately and efficiently. The present disclosure provides specific systems and methods that encompass some of the possibilities for acquiring this data accurately and efficiently.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the disclosures described herein can be embodied within a form that does not provide all of the features and benefits set forth herein, as some features can be used or practiced separately from others. The scope of certain disclosures disclosed herein is indicated by the appended claims rather than by the foregoing description. All changes which come within the meaning and range of equivalency of the claims are to be embraced within their scope.

We claim:

1. A sensor system comprising:
one or more boundary sensors configured to be positioned and calibrated to measure entrance into a space and exit from the space by one or more occupants, the one or more boundary sensors having a known error rate for measuring the entrance into the space and/or the exit from the space;
one or more space sensors configured to be positioned and calibrated to determine absence of occupants within the space, wherein the one or more space sensors are one or more passive motion sensors;
a processor operatively coupled to the one or more boundary sensors and the one or more space sensors; and
a non-transitory computer-readable medium having stored thereon instructions that, when executed by the processor, cause the processor to:
a) autonomously maintain an active count of occupancy of the space by counting instances of entrance into the space and exit from the space by the one or more occupants;
b) in response to the active count of occupancy of the space being less than zero, adjust the active count to zero;
c) in response to the one or more space sensors providing a determination of zero occupancy of the space when the active count is greater than zero, adjust the active count to zero, wherein the determination of zero occupancy of the space is not based on a predetermined length of time; and
d) provide the active count.

2. The sensor system of claim 1, wherein the space is a room or an arbitrarily-defined area or volume.

3. The sensor system of claim 1, wherein the space is a conference room, a study room, a meeting room, a convention hall, or a combination thereof.

4. The sensor system of claim 1, wherein the one or more boundary sensors include an optical curtain sensor, a magnetic curtain sensor, a break-beam sensor, an infrared curtain sensor, a passive infrared sensor, a video sensor, or a combination thereof.

5. The sensor system of claim 1, wherein the one or more boundary sensors are one or more passive infrared sensors.

6. The sensor system of claim 1, wherein the one or more space sensors include an infrared sensor, a floor pressure sensor, an ultrasonic sensor, a microwave sensor, an acoustic sensor, or a combination thereof.

7. The sensor system of claim 1, wherein the one or more space sensors are one or more passive infrared sensors.

8. The sensor system of claim 1, wherein the active count in step f) is provided to a computerized scheduling program, an emergency management program, or a combination thereof.

9. The sensor system of claim 1, wherein the instructions further cause the processor to control one or more affordances based on the active count or the method further comprises controlling one or more affordances based on the active count.

10. The sensor system of claim 1, wherein the instructions further cause the processor to, in response to an external indicator that the space is unoccupied, adjust the active count to zero.

11. The sensor system of claim 10, wherein the external indicator is provided by a computerized space scheduling program.

12. The sensor system of claim 1, wherein the one or more boundary sensors and the one or more space sensors are positioned and calibrated for use in the space.

13. The sensor system of claim 1, wherein the one or more boundary sensors are two or more boundary sensors, each of the two or more boundary sensors is configured to be or is positioned and calibrated within the space to monitor entrance into the space and exit from the space by the one or more occupants via different locations.

14. The sensor system of claim 1, wherein steps a), b), c), and d) are repeated to provide the active count at different times.

15. The sensor system of claim 14, wherein the active count versus time is stored for making a recommendation for use of the space.

16. A method of maintaining an active count of users in a space, the method comprising:
 a) monitoring one or more boundary sensors positioned and calibrated within the space to measure entrance into the space and exit from the space by one or more occupants, the one or more boundary sensors having a known error rate for measuring the entrance into the space and/or the exit from the space;
 b) monitoring one or more space sensors positioned and calibrated to determine absence of occupants within the space, wherein the one or more space sensors are one or more passive motion sensors;
 c) autonomously maintaining an active count of occupancy of the space by counting instances of entrance into the space and exit from the space by the one or more occupants;
 d) in response to the active count of occupancy of the space being less than zero, adjusting the active count to zero;
 e) in response to the monitoring of step b) providing a determination of zero occupancy of the space when the active count is greater than zero, adjusting the active count to zero, wherein the determination of zero occupancy of the space is not based on a predetermined length of time; and
 f) providing the active count.

17. A non-transitory computer-readable medium having stored thereon instructions that, when executed by a processor, cause the processor to:
 a) monitor one or more boundary sensors positioned and calibrated within the space to measure entrance into the space and exit from the space by one or more occupants, the one or more boundary sensors having a known error rate for measuring the entrance into the space and/or the exit from the space;
 b) monitor one or more space sensors positioned and calibrated to determine absence of occupants within the space, wherein the one or more space sensors are one or more passive motion sensors;
 c) autonomously maintain an active count of occupancy of the space by counting instances of entrance into the space and exit from the space by the one or more occupants;
 d) in response to the active count of occupancy of the space being less than zero, adjust the active count to zero;
 e) in response to the monitoring of step b) providing a determination of zero occupancy of the space when the active count is greater than zero, adjust the active count to zero, wherein the determination of zero occupancy of the space is not based on a predetermined length of time; and
 f) provide the active count.

\* \* \* \* \*